United States Patent [19]

Haggstrom

[11] Patent Number: 5,045,827
[45] Date of Patent: Sep. 3, 1991

[54] LOW-FORCE TRANSDUCER

[75] Inventor: Rolf P. Haggstrom, East Walpole, Mass.

[73] Assignee: BLH Electronics, Inc., Canton, Mass.

[21] Appl. No.: 614,158

[22] Filed: Nov. 15, 1990

Related U.S. Application Data

[63] Continuation of Ser. No. 500,578, Mar. 28, 1990, abandoned, which is a continuation of Ser. No. 297,596, Jan. 17, 1989, abandoned.

[51] Int. Cl.⁵ .......................... G01L 1/22; G01B 7/16
[52] U.S. Cl. .............................................. 338/2; 338/6
[58] Field of Search ........................................ 338/2-6; 177/211; 73/862.65

[56] References Cited

U.S. PATENT DOCUMENTS

| | | | |
|---|---|---|---|
| 4,094,192 | 6/1978 | Watson et al. | 338/2 X |
| 4,151,502 | 4/1979 | Kurihara et al. | 338/2 |
| 4,758,692 | 7/1988 | Roeser et al. | 338/2 |

Primary Examiner—Marvin M. Lateef
Attorney, Agent, or Firm—Fish & Richardson

[57] ABSTRACT

A low level strain gage transducer including housing which supports a strain member having a fixed end member and a free end member in the form of a cup, the free end member supported by a folded arm arrangement including one or more arms which permits the element being monitored for strain forces to pivot with respect to the cup so as to to accommodate any misalignment forces applied to the cup that would otherwise generate bending forces resulting in erroneous strain measurements.

8 Claims, 2 Drawing Sheets

LOW-FORCE TRANSDUCER

This is a continuation of co-pending application Ser. No. 07/500,578 filed on Mar. 28, 1990 which is a continuation of Ser. No. 07/297,596 filed on Jan. 17, 1989, both now abandoned.

BACKGROUND OF THE INVENTION

The invention relates generally to the field of strain gages, and more particularly to transducers for accurately measuring low level forces.

Low level force transducers are used in a number of devices to measure small forces which are generated during operation to ensure that the forces remain within predetermined ranges. For example, a device for winding magnetic tape onto a reel typically includes a low level tension measuring transducer to monitor the tension on the tape as it is being wound. This helps assure not only that tape is wound onto the reel with a uniform tension, but also provides a means for helping prevent tape breakage, which happens if the forces get too large.

Typically, a low level strain gage transducer comprises a strain member which deforms as force is applied. An electrical bridge circuit with four or more arms is mounted on the strain member, and each of the arms includes an electrical resistance strain gage. When force is applied, the member and one or more of the strain gages on it are deformed slightly. This causes variations in resistance in one or more of the arms, unbalancing the electrical bridge. The amount of the unbalancing of the bridge determines the degree of deformation of the strain member, from which (along with the member's materials and design), the amount of the strain can be determined.

A typical transducer for a low level force transducer includes a housing in which the strain member is mounted. The strain member itself includes two parallel end members connected in a cantilevered fashion by two perpendicular beams. The bridge circuit is mounted on the beams. One of the end members is fixed the housing, while the other end member is free. In operation, the element to be monitored (e.g., a roller) is attached to the free end member so that force is applied to it. Since the housing and the fixed end member attached thereto are stationary, the force applied to the free end member deforms the perpendicular beams connecting the free end member to the fixed end member. This results in a change in the electrical characteristics of the bridge circuit on the beams.

The strain gage transducer is optimally positioned so that the force to be measured is applied perpendicularly to the free end member. Under those circumstances, the free end member transmits this force evenly to the beams. This results in pure tension on or compression of the beams, and the force measurement is an accurate one. If, however, the transducer is misaligned with the force being applied, that is, if it is positioned so that the force is not entirely perpendicular to the free end member (or not entirely parallel to the beams), the applied force generates complex bending forces on the beams, resulting in errors in the measurement. As a result, there is a need for a low level strain gage transducer which is not susceptible to such errors.

SUMMARY OF THE INVENTION

The invention provides a new and improved low level strain gage transducer that minimizes measurement errors resulting from forces that may be applied. The new transducer includes a housing supporting a fixed end of a strain member. The strain member also includes a free end which has a folded arm or cup arrangement for supporting the element being monitored (e.g., a roller). This arrangement permits the free end to pivot, and thus, non perpendicular forces do not generate the bending forces on the device that result in measurement errors in other low level strain gage transducers.

BRIEF DESCRIPTION OF THE DRAWINGS

This invention is pointed out with particularity in the claims. The advantages of this invention may be better understood by referring to the following description taken in conjunction with the accompanying drawings, in which:

FIG. 4 is a side elevational view depicting an alternate strain member useful in the transducer depicted in FIG. 1.

DESCRIPTION OF THE PREFERRED EMBODIMENT

Figure 1:
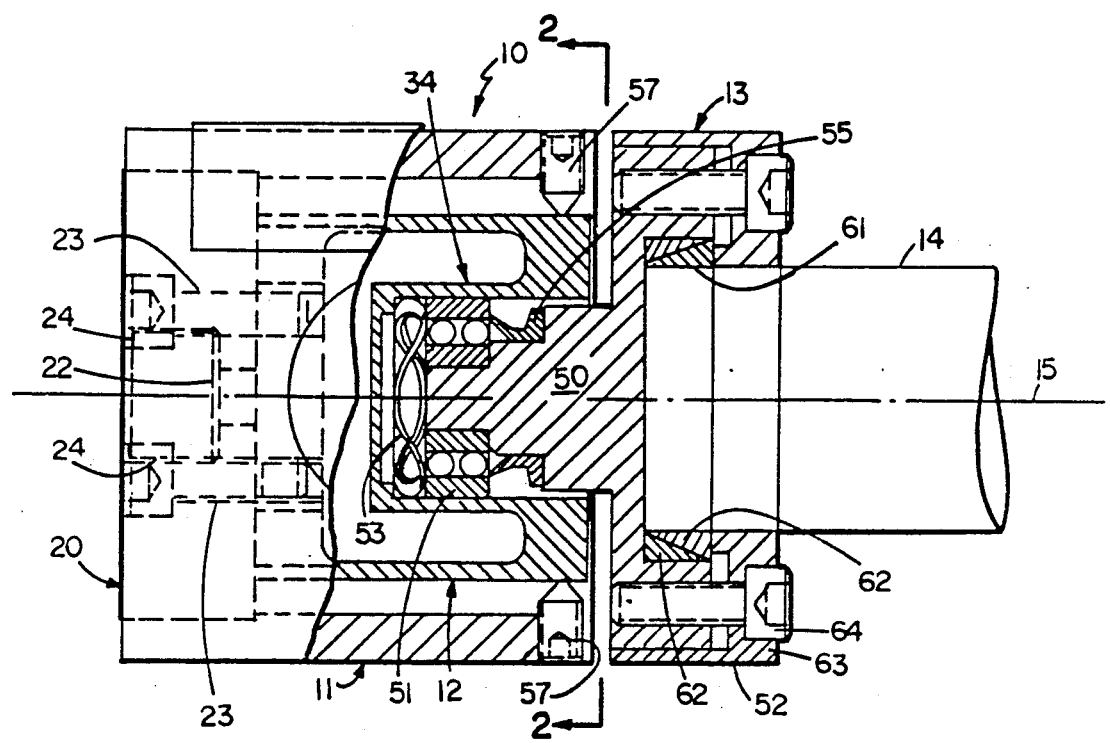
FIG. 1 is a side elevational view, partially in section, of a strain gage transducer of this invention.

With reference to FIG. 1, a transducer 10 includes a cup shaped housing 11 which supports a strain member 12. A fitting 13, mounted on the strain member 12, supports a roller 14 to be monitored. A force applied to the roller 14 along its longitudinal axis 15 is transferred by the fitting 13 to the strain member 12, which is deformed in response thereto. The degree of deformation of the member 12 is reflected in the amount of a change in resistance in one or more thin film resistors (not shown) mounted on the strain member 12 as described below.

Figure 2:
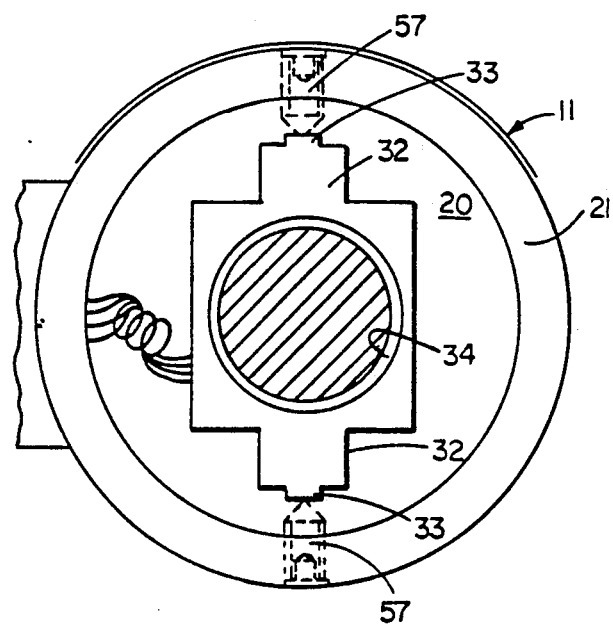
FIG. 2 is a cross-sectional view, taken along the line 2—2, of the transducer of FIG. 1.

The housing 11 includes a generally circular base 20, as best shown in FIG. 2, with a sidewall extending outwardly (to the right as shown in FIG. 1) from the periphery of the base 20. A threaded aperture 22 permits the housing 11 to be affixed to a mounting (not shown). Four openings 23 (two shown in FIG. 1) in the base 20 symmetrically disposed around its horizontal axis permit threaded fasteners 24 to secure the strain member 12 to the base 20.

Figure 3:
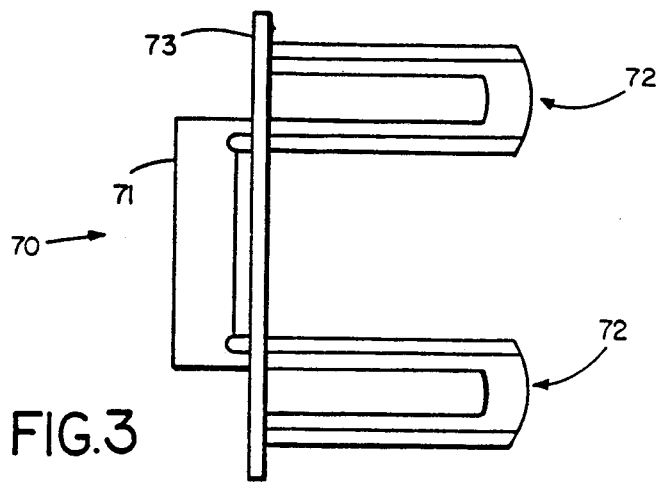
FIGS. 3A and 3B are a view a strain member of the transducer of this invention.
Figure 3A:
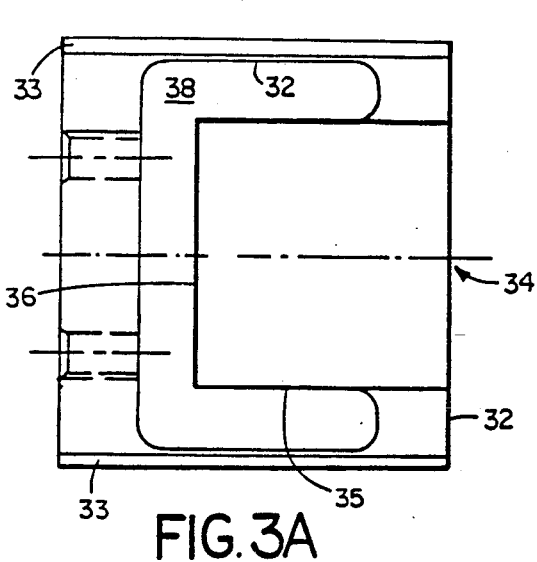
Figure 3B:
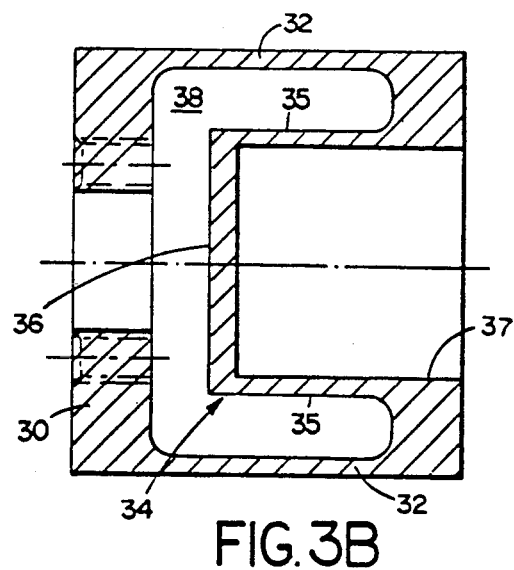

The strain member 12 is best shown in FIGS. 3A and 3B, and it includes a fixed end member 30, which when assembled is attached to the housing 11. Parallel beams 32 extend from the fixed end member 30 to a free end member comprising circular cup 34. The beams 32 each have a narrow ridge 33 (best shown in FIG. 2) extending their length. The cup 34 has a circular base 36 with cylindrical sidewall 35. There is a circular opening 37 opposite the base 36. The sidewall 35 of the cup 34 is generally parallel to the beams 32. An opening 38 extends around the cup 34 and separates it from both the end member 30 and the beams 32.

The fitting 13 is mounted in the cup 34 as shown in FIG. 1. As force is applied to the roller 14, it is transmitted to the cup 34, causing deformation of the beams 32 on which it is supported. Thin film resistors (not shown), which form an electrical bridge, are affixed to the beams 32 to enable the degree of deformation to be measured, the degree of which indicates the amount of force applied by the roller 14. An adhesive called QA-600 available from BLH Electronics, Inc. of Canton, Mass. may be used to affix the thin film resistors to the beams 32. In some cases, depending upon the application, the thin film resistors can be covered by a silicone material to protect them from moisture.

As shown in FIGS. 1, and 2, the beams 32 have a cross-section which allows them to flex in response to forces applied to them in the direction toward or away from cup 34, but generally to resist flexure in response to forces applied orthogonally thereto. In addition, the thin film resistors are oriented so as to be less sensitive to any flexible as a result of the latter forces.

The actual attachment of the fitting 13 to the inside of the cup 34 is shown in FIG. 1. The fitting 13 itself includes an insert member 50 for the cup 34 and a holder 52 for the roller 14. The insert member 50 is attached to the cup 34 through a bearing 51, allowing it to turn therein. A wave spring 53 separates the end of the insert member 50 and the bearing 51 from the base 36 of the cup 34. A seal 55 around the insert member 50 protects the bearing 51 from material from the outside. Set screws 57 are disposed through the wall 21, and as shown in FIG. 2, are disposed above the ridges 33 of the beams 32. The set screws 57 limit the travel of the beams 32 so as to protect the transducer from unusually high forces. Their position is adjustable.

The roller 14 itself is mounted to the holder 52 in a compression fit arrangement. The end of the roller 14 is positioned in a circular recess 61 in the holder 52, and beveled annular members 62 are positioned thereover. An end cap 63 is secured over the annular members 62 and fastened to the holder 52 by a threaded fastener 64. Tightening of the threaded fastener 64 during assembly of the rod fixture to the holder 52 forces the end cap 63 toward the holder 52. As a result, the annular members 62 are forced against the roller 14 and hold it in place.

The strain gage transducer of this invention provides a number of advantages. First, with respect to the strain member 12, since the force provided by the fitting 13 is applied proximate the base 36 of the cup 34, the sidewall 35 along with the beams 32 effectively form a folded arm arrangement between the point at which the strain member 12 is secured, namely, the cup's base 36 and the beams 32. The cup's sidewall 35 provides an effective extension of the "arm" interconnecting the point at which the fixture is secured and the point at which force is applied. Thus, if the force applied to the strain member 12 is not aligned along the axis 15 (which can occur if the force applied to the roller 14 is not precisely directed along the roller), the strain member can easily accommodate that, by pivoting at the pivot points.

Furthermore, the use of the bearing 51 permits the fitting 13 to swivel in the strain member 12, and, specifically, to accommodate twisting of the roller 14 which may occur during use or initial mounting of the transducer 10 in an apparatus prior to use.

It will be appreciated that the folded arm arrangement between the fixed and free ends (e.g., in the preferred embodiment, fixed end 30 and cup 34 respectively) of the transducer, the latter at which the force being measured by the transducer is applied, can also be realized in diverse other arrangements. In addition, it will be appreciated that many benefits of the invention can also be achieved in an outwardly folding arm arrangement, as depicted in FIG 4. In this embodiment, the transducer includes a rectangular base 71 from which extend two beams 72. The beams 72 fold outwardly away from each other and back toward the plane of the base 71 to connect with an annular member 73 located adjacent to the base 71. In this arrangement, the base 71 is attached to a housing (not shown) and the annular member 73 is attached to the roller (not shown). The annular member 73 and the base 71 essentially correspond to the cup 34 and the fixed end member 30 of the inwardly-extending arm arrangement of FIG. 1.

The foregoing description has been limited to a specific embodiment of this invention. It will be apparent, however, that variations and modifications may be made to the invention, with the attainment of some or all of the advantages of the invention.

What I claim is:

1. A low level strain gage transducer for measuring the amount of strain caused by a strain generating element comprising:
    a measurement means having a fixed end member adapted to be secured to a housing, and a free end member, said free end member comprising a base with an extension means connected thereto, and when in use, said free end member receiving a portion of the strain generating member,
    a beam means attached to said fixed end member,
        said beam means having a first end connected to said extension means at its end opposite said free end member base, said beam means deforming when strain force is applied to said free end member.

2. The transducer of claim 1 wherein said beam means has a second end, said second end being attached to said fixed end member.

3. The transducer of claim 2 wherein said beam means comprises a pair of arms, said arms being spaced apart and extending from opposite sides of said fixed end member.

4. The transducer of claim 3 wherein said arms each have a deformable resistance element mounted thereon, the deformation of which provides an electrical means for measuring the strain force causing the deformation.

5. The transducer of claim 4 wherein each of said arms is relatively flexible in response to forces applied in a direction along a plane defined by said arms, and relatively inflexible in response to forces applied along directions orthogonal thereto.

6. The transducer of claim 1 wherein said base of said free end member is generally circular and said extension means comprises a sidewall thereon.

7. The transducer of claim 6 wherein said free end member is a cup into which the element fits and is secured at the base end, the element applying longitudinal strain forces to said free end member but pivoting in said cup so as not to transmit other non-longitudinal strain forces to said free end member.

8. The transducer of claim 7 wherein said sidewall is disposed parallel to and between said beam means.

* * * * *